April 12, 1927.  J. A. SCHINNER  1,624,807
PNEUMATIC PAD
Filed March 13, 1926   2 Sheets-Sheet 1
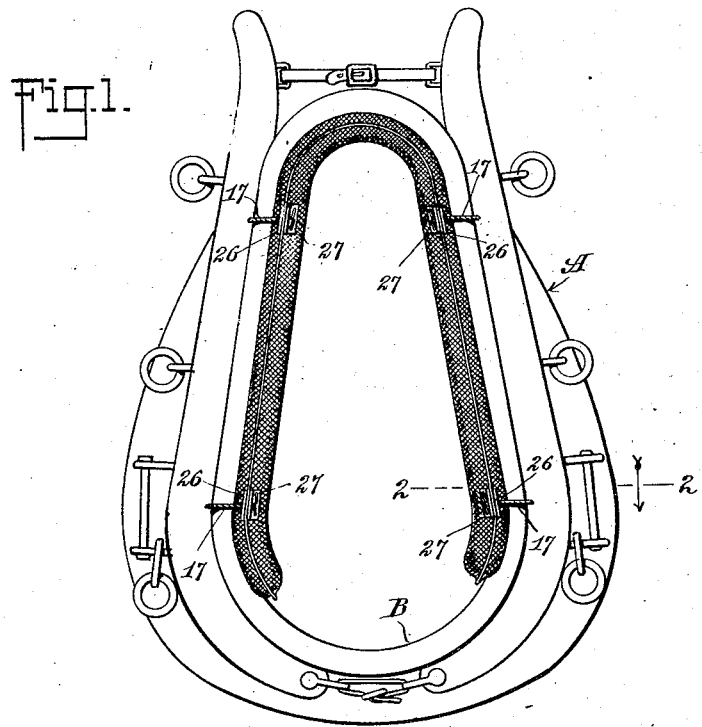
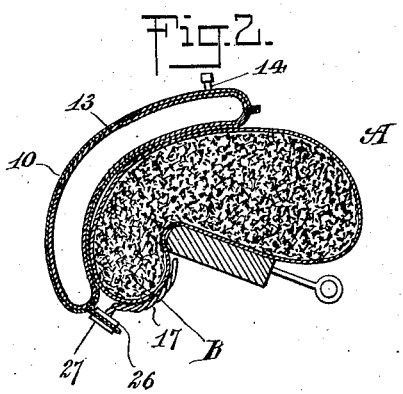
WITNESSES
William P. Goebel.
Hugh H. Ott
INVENTOR
Joseph A. Schinner
BY
ATTORNEYS April 12, 1927.
J. A. SCHINNER
PNEUMATIC PAD
Filed March 13, 1926
1,624,807
2 Sheets-Sheet 2
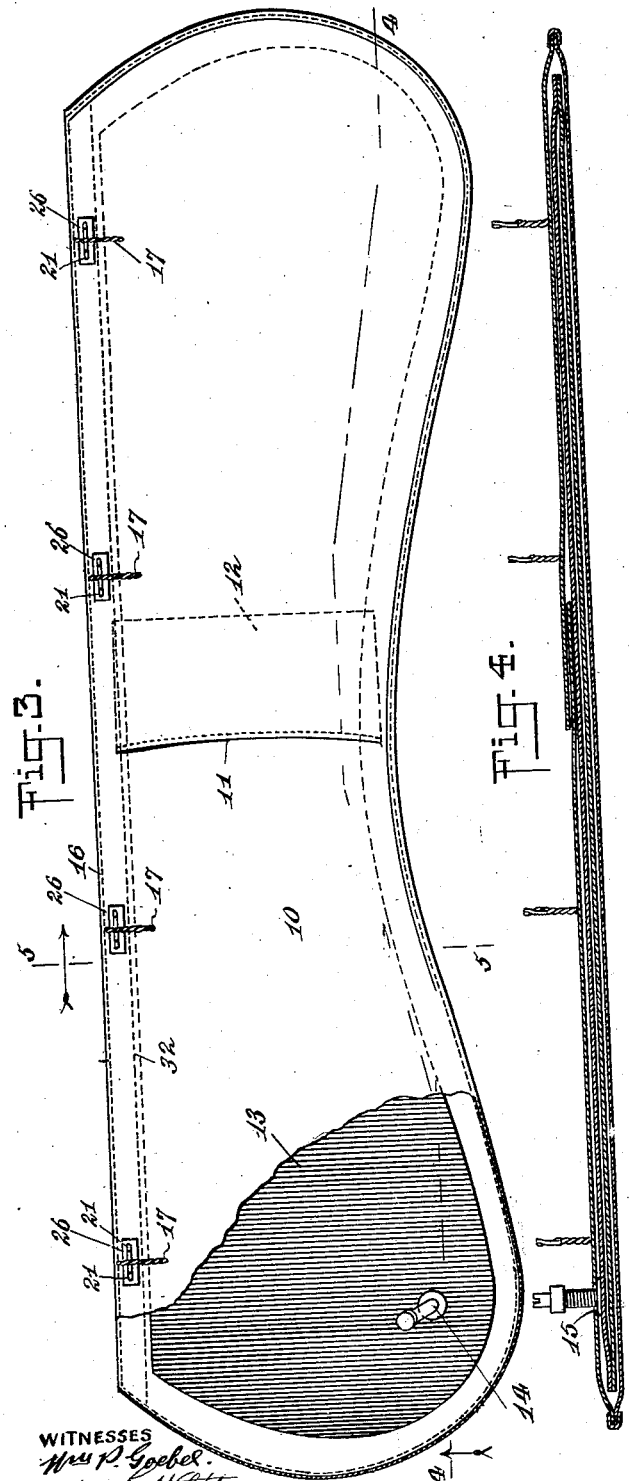
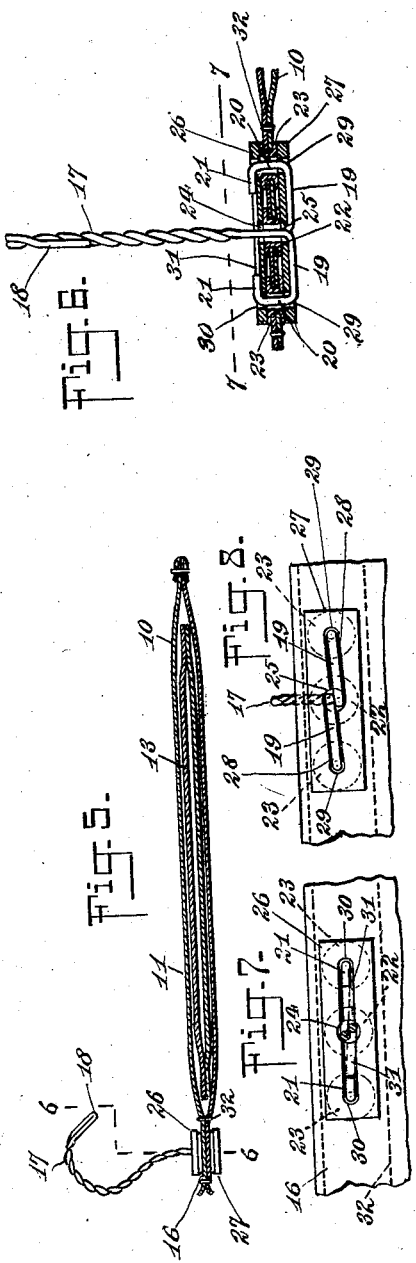
INVENTOR
Joseph A. Schinner
BY
ATTORNEYS
WITNESSES Patented Apr. 12, 1927.

1,624,807

UNITED STATES PATENT OFFICE.

JOSEPH A. SCHINNER, OF GREENFIELD, OHIO.

PNEUMATIC PAD.

Application filed March 13, 1926. Serial No 94,477.

This invention relates to pads for horses or other beasts of burden, the same being designed particularly as a collar pad, gig pad, saddle pad, or for analogous uses.

Primarily the invention comprehends a pneumatic pad which functions to more effectively ease the strain on the beast, to afford an effective cushion between the harness and the animal for preventing soreness, and to afford a pad which is simple and light in construction and comparatively inexpensive to produce.

The invention furthermore contemplates means for associating the pad with the harness, which means allows for the ready attachment and detachment, and functions to prevent accidental displacement of the pad.

With the above recited and other objects in view, reference is had to the following specification and accompanying drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Figure 1 illustrates a front view of a horse collar equipped with a pad constructed in accordance with the invention;

Fig. 2 is a sectional view therethrough taken approximately on the line 2—2 of Fig. 1;

Fig. 3 is a plan view of the pad with parts broken away and shown in section to disclose the underlying structure;

Fig. 4 is a sectional view taken approximately on the line 4—4 of Fig. 3;

Fig. 5 is a sectional view taken approximately on the line 5—5 of Fig. 3;

Fig. 6 is a detail sectional view taken approximately on the line 6—6 of Fig. 5;

Fig. 7 is a sectional view taken approximately on the line 7—7 of Fig. 6;

Fig. 8 is a detail fragmentary body plan view of one edge of the pad.

In the drawings the pad is particularly illustrated as a collar pad, but it is obvious that the design or shape of the same may be varied in order to adapt the same for other uses within the scope of the invention.

Referring to the drawings by characters of reference, the pad includes a flexible cover or casing 10 of the desired configuration, which is formed with an opening 11 having a closure flap 12 substantially medially thereof to admit of the insertion and removal of an inflatable filler member 13 having any suitable inflation valve 14 which extends through an opening 15 in the outer casing or covering 10 whereby the filler member in deflated condition may be introduced through the opening 11 to the interior of the outer casing or covering 10 and subsequently inflated to provide a pneumatic pad, it being understood that the valve member conforms substantially to the configuration of the outer casing or covering.

In order to provide means for connecting and retaining the pad with the harness, one of the edges 16 of the outer covering 10 carries a plurality of harness-engaging hooks 17, each of which comprises a length of wire bent medially upon itself to provide strands which are intertwisted together for the major portion of their length from the nose 18 of the hook to the base. At this point the strands are bent laterally at 19, thence rearwardly at 20 substantially parallel to the length of the hook with inwardly directed terminals 21. The edge 16 of the outer covering adjacent each hook base is provided with a set of eyelets including an intermediate eyelet 22 and a pair of outer eyelets 23, the pair of strands of wire forming the hook at the juncture with the base, passing through the central eyelet 22 and through alined central apertures 24 and 25 in binding plates 26 and 27 arranged on opposite sides of the edge 16. The laterally bent portions 19 of the strands are received in grooves 28 in the plate 27, which grooves extend to and communicate with outer apertures 29 alining with the outer eyelets 23 through which the return bent portions 20 of the strands extend. Said return bent portions 20 also extend through outer apertures 30 in the opposite plate 26 with the terminals lying within the grooves 31, which communicate with the central opening 24 of the plate 26. In order to define the edge 16, the outer covering 10 is provided with a line of stitching 32 parallel to and spaced from the edge of the pad body, so that the edge portion 16 which carries the attaching and retaining hooks, is substantially separated from the filler receiving compartment and affords a flexible portion to allow for a canting of the hooks to engage the same with the harness member to which the pad is applied.

When the pad is designed for association with a collar A, as illustrated, the hooks 17 are engaged around the inner forwardly projecting boss B of the collar so that the body is interposed between the inner bearing surface of the collar and the neck and shoulder of the animal. The inflated pad forms a pneumatic cushion between the collar body and the animal's neck and shoulder, which properly equalizes the pressure thereon and cushions the strains and stresses to prevent undue rubbing. It will be furthermore noted that this construction eliminates the absorption of sweat and hardening of the pad, which is a common objection to the ordinary forms of solid felt pads now in general use. It is still further obvious that the inflated or pneumatic pad functioning to give the best cushioning effect, is also extremely light in weight, thus reducing the burden of weight to be carried by the animal. The invention further provides a harness pad which when deflated is capable of folding into a compact arrangement for storage or shipment when not in use.

What is claimed is:

1. In a harness pad for draft animals, including an inflatable pad body and an outer covering therefor provided with openings in an edge thereof, means for attaching the pad and retaining the same in juxtaposition to the harness, comprising a plurality of hook members arranged in spaced relation at said edge of the outer covering, said hook members comprising a single length of material bent medially upon itself to provide a pair of strands intertwisted from the nose of the hook to its base, and the free ends of the strands being bent laterally, reversely and inwardly and extending through one of said openings and a pair of said openings disposed outwardly of said first-mentioned opening.

2. In a harness pad for draft animals, including an inflatable pad body and an outer covering therefor provided with openings in an edge thereof, means for attaching the pad and retaining the same in juxtaposition to the harness, comprising a plurality of hook members arranged in spaced relation at said edge of the covering, said hook members comprising a single length of material bent medially upon itself to provide a pair of strands intertwisted from the nose of the hook to its base, the free ends of the strands being arranged laterally, reversely and inwardly and extending through one of said openings and a pair of said openings disposed outwardly of said first-mentioned opening, and reinforcing members in the edge of the covering and arranged on opposite side thereof having perforations alining with each other and with the perforations in the pad covering.

3. In a harness pad for draft animals, including an inflatable pad body and an outer covering therefor provided with openings in an edge thereof, means for attaching the pad and retaining the same in juxtaposition to the harness, comprising a plurality of hook members arranged in spaced relation at said edge of the covering, said hook members comprising a single length of material bent medially upon itself to provide a pair of strands intertwisted from the nose of the hook to its base, the free ends of the strands being arranged laterally, reversely and inwardly and extending through one of said openings and a pair of said openings disposed outwardly of said first-mentioned opening, reinforcing members in the edge of the covering and arranged on opposite sides thereof having perforations alining with each other and with the perforations in the pad covering, and a flexible portion on the said pad covering defined by a line of stitching parallel with the edge thereof and disposed beyond the pad body receiving compartment of the covering to permit of canting of the hooks when the same are engaged with and are disengaged from the harness member to which the pad is adapted to be applied.

JOSEPH A. SCHINNER.